(12) United States Patent
Lin (10) Patent No.: US 10,013,419 B2
(45) Date of Patent: Jul. 3, 2018

(54) FILE STORAGE METHOD AND APPARATUS, AND STORAGE MEDIUM

(71) Applicant: TENCENT TECHNOLOGY (SHENZHEN) COMPANY LIMITED, Shenzhen (CN)

(72) Inventor: Daozheng Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 760 days.

(21) Appl. No.: 14/566,492

(22) Filed: Dec. 10, 2014

(65) Prior Publication Data

US 2015/0095382 A1 Apr. 2, 2015

Related U.S. Application Data

(63) Continuation of application No. PCT/CN2013/076911, filed on Jun. 7, 2013.

(30) Foreign Application Priority Data

Jun. 12, 2012 (CN) .......................... 2012 1 0192669

(51) Int. Cl.
*G06F 12/00* (2006.01)
*G06F 17/30* (2006.01)

(52) U.S. Cl.
CPC .. *G06F 17/30076* (2013.01); *G06F 17/30091* (2013.01); *G06F 17/30135* (2013.01)

(58) Field of Classification Search
USPC .................. 707/705, 758, 804, 821; 711/171
See application file for complete search history.

(56) References Cited

U.S. PATENT DOCUMENTS

| 5,398,142 | A | * | 3/1995 | Davy | G06F 3/0611 360/48 |
| 5,819,290 | A | * | 10/1998 | Fujita | G06F 3/0608 707/700 |
| 5,930,828 | A | * | 7/1999 | Jensen | G06F 3/0608 360/48 |
| 6,070,172 | A | * | 5/2000 | Lowe | G06F 3/0608 |
| 6,173,291 | B1 | * | 1/2001 | Jenevein | G06F 11/1435 |
| 8,208,793 | B2 | * | 6/2012 | Murakami | G11B 27/002 386/263 |

(Continued)

FOREIGN PATENT DOCUMENTS

| CN | 1405705 A | 3/2003 |
| CN | 101556557 A | 10/2009 |

(Continued)

OTHER PUBLICATIONS

International Search Report for International Application No. PCT/CN2013/076911, dated Sep. 19, 2013.

(Continued)

*Primary Examiner* — Cheyne D Ly
(74) *Attorney, Agent, or Firm* — Knobbe Martens Olson & Bear LLP (57) ABSTRACT

The provided is a file storage method and apparatus. The method includes: recognizing an editable file; and storing the editable file continuously, and reserving additional storage space for the editable file. The embodiments of the present disclosure may prevent the generation of file fragmentation to some degree.

11 Claims, 4 Drawing Sheets

(56) References Cited

U.S. PATENT DOCUMENTS

| | | | |
|---|---|---|---|
| 8,370,294 B2* | 2/2013 | Lyakhovitskiy | G06F 17/30067 |
| | | | 707/609 |
| 2001/0018727 A1* | 8/2001 | Ando | G11B 20/1883 |
| | | | 711/112 |
| 2006/0080350 A1 | 4/2006 | Mark | |
| 2007/0143563 A1* | 6/2007 | Pudipeddi | G06F 3/0607 |
| | | | 711/173 |
| 2011/0282884 A1 | 11/2011 | Ma | |

FOREIGN PATENT DOCUMENTS

| | | |
|---|---|---|
| CN | 102096679 A | 6/2011 |
| CN | 102141960 A | 8/2011 |
| CN | 102693325 A | 9/2012 |
| WO | WO 2011/159495 A2 | 12/2011 |

OTHER PUBLICATIONS

International Preliminary Report on Patentability with Translation issued in International Application No. PCT/CN2013/076911 dated Dec. 16, 2014.

Office Action issued in Chinese Application No. 201210192669.6 dated Jul. 25, 2013.

Office Action issued in Chinese Application No. 201210192669.6 dated Oct. 21, 2013.

\* cited by examiner

FILE STORAGE METHOD AND APPARATUS, AND STORAGE MEDIUM

This application is a continuation of International Application No. PCT/CN2013/076911, filed on Jun. 7, 2013, which claims the benefit and priority of Chinese Patent Application No. 201210192669.6, entitled "File Storage Method and Apparatus" and filed on Jun. 12, 2012 by Tencent Technology (Shenzhen) Company Limited. The entire disclosures of each of the above applications are incorporated herein by reference.

TECHNICAL FIELD

The present disclosure relates to computer technologies, particularly to a data storage method and apparatus, and more particularly to a file storage method and apparatus, and a storage medium.

BACKGROUND

Each track of a disk in a computer is divided into multiple arc segments, and each arc segment is a sector of the disk. An operation system may divide the disk space of the disk into multiple disk volumes to manage the disk. For example, C disk is a disk volume. The space of each disk volume is further divided into multiple clusters. A Logical Cluster Number (LCN) is a serial number of a cluster in the disk volume. LCNs may be assigned to clusters in a disk volume according to the physical locations of the clusters in the disk volume. And thus, a LCN may represent the physical location of a cluster in the disk volume. Cluster is the smallest unit of disk file storage and management. Sectors included in one cluster may be different from sectors included in another cluster because of different file systems.

In actual applications, many file fragmentations may be generated on the disk along with the usage of the computer. That is, different parts of a file may be stored in multiple clusters in a disk volume, and the LCNs of the multiple clusters may be incontinuous, as shown in FIG. 1.

Figure 1:
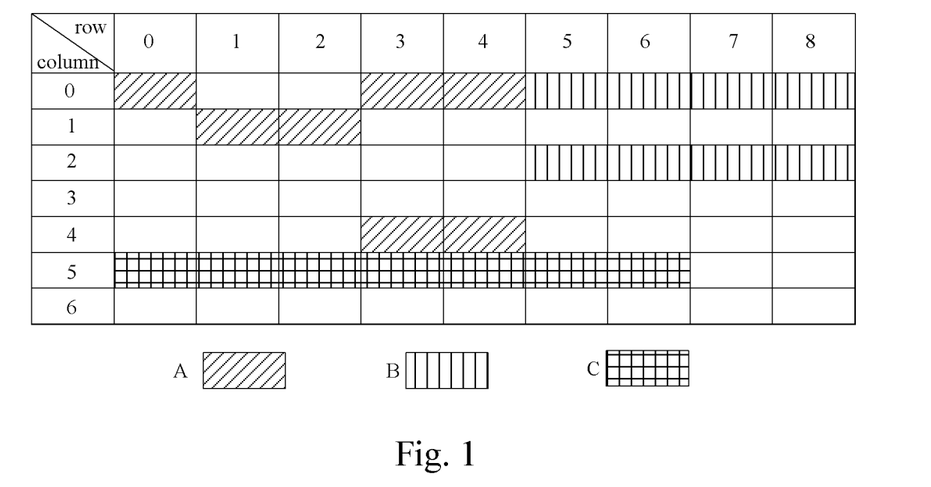
FIG. 1 is a diagram illustrating file storage on a disk.

FIG. 1 is a diagram illustrating file storage on a disk. Each cell in FIG. 1 represents one cluster. As shown in FIG. 1, a file C is stored continuously, and a file A and a file B both include file fragmentations. That is, the LCNs of clusters in which the file A is stored are incontinuous, and the LCNs of clusters in which the file B is stored are also incontinuous.

Because the file fragmentations are not stored on the disk continuously, the seek time of the disk is increased, thereby decreasing the Input/Output (IO) performance of the disk.

The scattered file fragmentations may be put together again through disk defragmentation, so that all contents of a file are stored continuously on the disk. Accordingly, the IO performance of the disk may be improved. Further, when the scattered file fragmentations are put together again, the file may be compressed, thereby implementing compact arrangement.

The conventional disk defragmentation solution just integrates file fragmentations of a file together to make the file fragmentations of the file be stored continuously on the disk. However, if new contents are added into the file afterwards, new file fragmentations may be generated, which may result in repeated disk defragmentation.

SUMMARY

Embodiments of the present disclosure provide a file storage method and apparatus, and a storage medium, so as to prevent the generation of file fragmentation to some degree.

The file storage method includes:
recognizing an editable file; and
storing the editable file continuously, and reserving additional storage space for the editable file.

The file storage apparatus includes a recognizing module and a sorting module;
the recognizing module is to recognize an editable file; and
the sorting module is to store the editable file continuously, and reserve additional storage space for the editable file.

A computer readable storage medium includes computer program codes for executing the steps of the above method.

As can be seen from the above solution, after an editable file is recognized, not only the editable file is stored continuously, but also additional storage space is reserved for the editable file. In this way, contents newly added into the editable file may be stored in the reversed storage space, so as to prevent the generation of file fragmentation to some degree.

To sum up, after the editable file is recognized, some processing is performed for the editable file. That is, the additional storage space is reserved for the editable file when the editable file is stored, so as to prevent the generation of file fragmentation to some degree.

DETAILED DESCRIPTION

The solution provided by the embodiments of the present disclosure will be illustrated hereinafter with reference to the accompanying drawings and specific embodiments. Obviously, the described embodiments are only partial embodiments of the present disclosure, but are not all embodiments. The present disclosure may be represented as different forms, and thus is not limited to the described embodiments. According to the embodiments of the present disclosure, those skilled in the art can obtain other embodiments without creative labor, which belong to the protection scope of the present disclosure.

Figure 2:
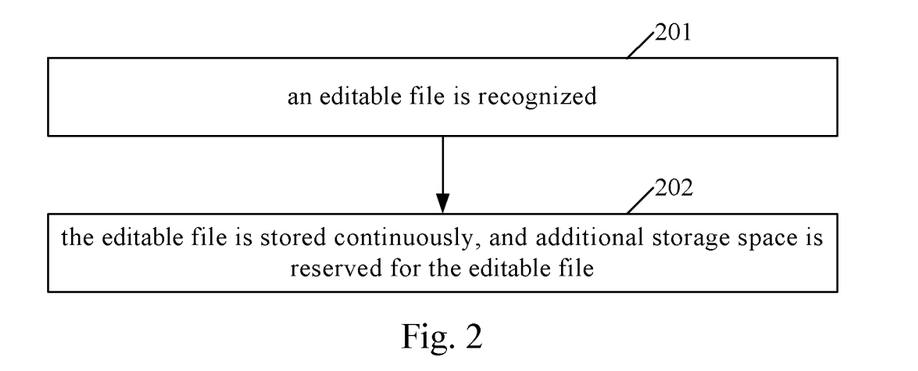
FIG. 2 is a flowchart illustrating a file storage method according to an embodiment of the present disclosure.

FIG. 2 is a flowchart illustrating a file storage method according to an embodiment of the present disclosure.

As shown in FIG. 2, the method includes following blocks.

At block 201, an editable file is recognized.

At block 202, the editable file is stored continuously, and additional storage space is reserved for the editable file.

After the editable file is recognized, some processing is performed for the editable file. That is, the additional storage space is reserved for the editable file when the editable file is stored, so as to prevent the generation of file fragmentation to some degree.

Figure 3:
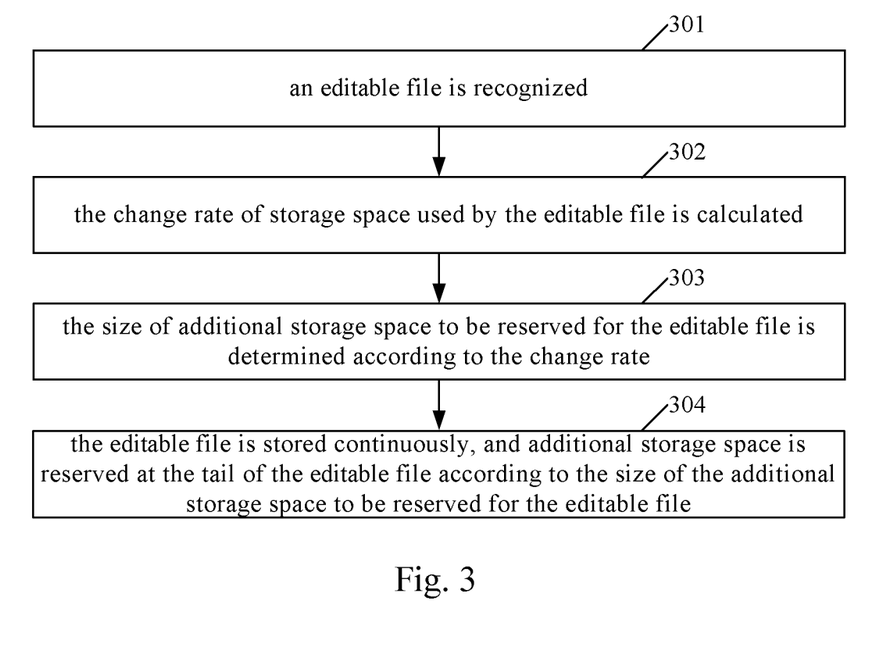
FIG. 3 is a flowchart illustrating a file storage method according to another embodiment of the present disclosure.

FIG. 3 is a flowchart illustrating a file storage method according to another embodiment of the present disclosure.

As shown in FIG. 3, the method includes following blocks.

At block 301, an editable file is recognized.

At block 302, the change rate of storage space used by the editable file is calculated.

At block 303, the size of additional storage space to be reserved for the editable file is determined according to the change rate.

At block 304, the editable file is stored continuously, and additional storage space is reserved at the tail of the editable file according to the size of the additional storage space to be reserved for the editable file.

In the method shown in FIG. 3, through obtaining the change rate of the storage space used by the editable file and determining the size of the additional storage space to be reserved for the editable file according to the change rate, the size of the additional storage space reserved for the editable file can be adaptable to the actual change of the storage space used by the editable file, thereby improving the utilization of storage space. Through reserving the additional storage space at the tail of the editable file, the contents newly added into the editable file may be stored into the reserved storage space, thereby preventing the generation of file fragmentations to some degree.

In the embodiments of the present disclosure, the editable file refers to a file whose contents may be modified by a user or an application. For example, a file with a suffix ".log", ".txt", ".docx", ".wps" or ".db" is an editable file.

A non-editable file refers to a file whose contents cannot be modified by a user or an application. For example, a file with a suffix ".dll" or ".PDF" is a non-editable file.

The file storage method provided based on FIGS. 1 and 2 may be applied to a disk defragmentation process. For the non-editable file, the disk defragmentation method is not limited. For example, the non-editable file may be stored continuously and arranged compactly. A disk defragmentation process will be illustrated hereinafter, referring to FIG. 4. As an example, the non-editable file is arranged compactly in the disk defragmentation process.

Figure 4:
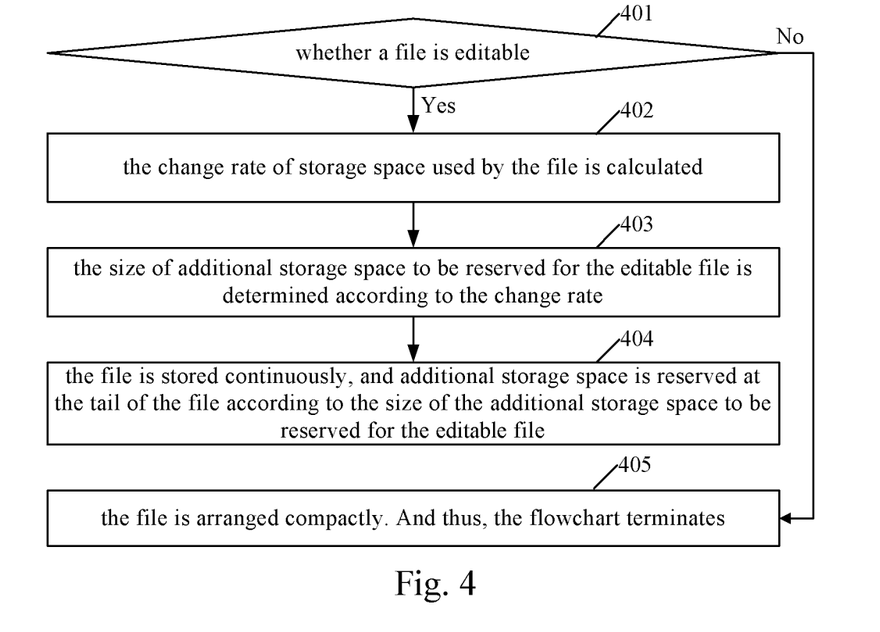
FIG. 4 is a flowchart illustrating a method for performing disk defragmentation on a file according to an embodiment of the present disclosure.

FIG. 4 is a flowchart illustrating a method for performing disk defragmentation on a file according to an embodiment of the present disclosure.

As shown in FIG. 4, the method includes following blocks.

At block 401, it is determined whether a file is editable. If the file is editable, block 402 is performed. Otherwise, block 405 is performed.

At block 402, the change rate of storage space used by the file is calculated.

At block 403, the size of additional storage space to be reserved for the editable file is determined according to the change rate.

At block 404, the file is stored continuously, and additional storage space is reserved at the tail of the file according to the size of the additional storage space to be reserved for the editable file. And thus, the flowchart terminates.

At block 405, the file is arranged compactly. And thus, the flowchart terminates.

FIGS. 2 to 4 all include the process of determining whether a file is editable. In an actual application, it may be determined whether the file is editable according to the suffix and/or contents of the file.

In an implementation, it may be determined whether the file is editable according to the suffix of the file. In another implementation, an initial character string of the file may be recognized, and it may be determined whether the file is editable according to the initial character string of the file. In another implementation, printable characters in the contents of the file may be recognized, an occurring frequency of the printable characters in the contents of the file is determined, and the file is determined to be editable when the occurring frequency is higher than a predefined threshold. The file is determined to be non-editable when the occurring frequency is not higher than the predefined threshold. The printable characters refer to characters that can be input into a computer through an input device such as a keyboard and can be displayed. Characters that cannot be input the computer through the input device such as the keyboard are non-printable characters. For example, garbled characters displayed on the computer are non-printable characters.

Figure 5:
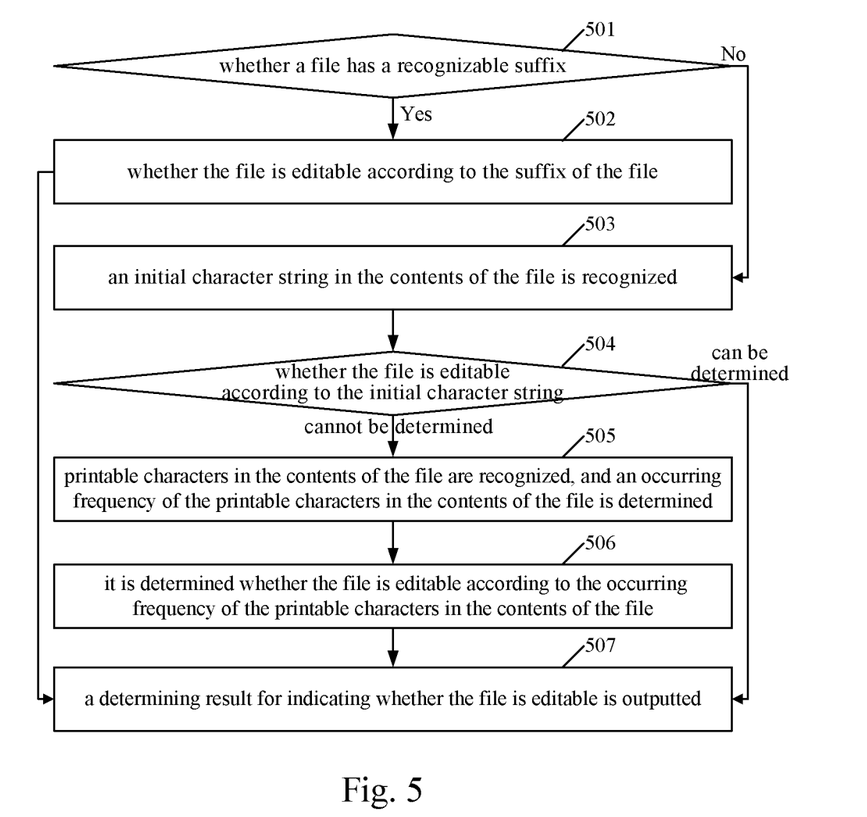
FIG. 5 is a flowchart illustrating a method for recognizing an editable file according to an embodiment of the present disclosure.

The above methods for determining whether the file is editable may be used separately or combined together. For example, it may be determined first whether the file is editable according to the suffix of the file. If the file has no suffix, it may be determined whether the file is editable according to the initial character string of the file or the occurring frequency of the printable characters in the contents of the file. Referring to FIG. 5, a method for recognizing an editable file will be illustrated hereinafter.

FIG. 5 is a flowchart illustrating a method for recognizing an editable file according to an embodiment of the present disclosure.

As shown in FIG. 5, the method includes following blocks.

At block 501, it is determined whether a file has a recognizable suffix. If the file has a recognizable suffix, block 502 is performed. Otherwise, block 503 is performed.

At block 501, it may be determined first whether the file has a suffix. If the file has no suffix, block 503 is performed. If the file has a suffix, but it cannot be determined whether file is editable according to the suffix, block 503 is performed. If it can be determined whether the file is editable according to the suffix, that is, the file has a recognizable suffix, block 502 is performed.

At block 502, it is determined whether the file is editable according to the suffix of the file, and block 507 is performed.

At block 503, an initial character string in the contents of the file is recognized.

At block 504, it is determined whether the file is editable according to the initial character string. If it can be determined whether the file is editable, block 507 is performed. If it cannot be determined whether the file is editable, block 505 is performed.

At block 504, it may be determined first according to the contents of the initial character string whether the format of the file may be recognized. If the format of the file may be recognized, it is determined according to the format of the file whether the file is editable. If the format of the file cannot be recognized, or it cannot be determined according to the format of the file whether the file is editable, block 505 is performed. The contents of the initial character string usually include the contents of a file header.

Since the contents and/or structure of the initial character string of a file having a specific format such as an executable file or an image file is fixed, the format of the file may be recognized according to the initial character string of the file.

At block 505, printable characters in the contents of the file are recognized, and an occurring frequency of the printable characters in the contents of the file is determined.

At block 506, it is determined whether the file is editable according to the occurring frequency of the printable characters in the contents of the file.

Generally, the higher the occurring frequency of the printable characters in the contents of the file is, the larger the possibility that the file is editable is. Accordingly, it may be determined whether the file is editable according to the occurring frequency of the printable characters in the contents of the file. For example, when the occurring frequency of the printable characters is higher than a predefined threshold, it may be determined that the file is editable. Otherwise, it may be determined that the file is non-editable. The predefined threshold may be a predefined fixed value, or a value determined according to a predefined rule.

At block 507, a determining result for indicating whether the file is editable is outputted.

In the embodiments of the present disclosure, the change rate of the storage space used by the file may be obtained according to previous recording information related to the file. For example, the change rate of the storage space used by the file may be obtained according to a file change date, file change size, the size of source file and the size of the changed file. The change rate may represent the change speed of file size, but an obtaining method of the change rate is not limited. For example, suppose a second time point "Btime" is a time point after a first time point "Atime", the change rate of the storage space used by the file may be obtained according to the size of the storage space used by the file at the second time point "Btime" and the size of the storage space used by the file at the first time point "Atime".

Since the change rate may represent the change speed of the file size, proper additional storage space may be reserved for the file according to the change rate. For example, more additional storage space may be reserved for a file whose size is increased rapidly, less additional storage space is reserved for a file whose size is increased slowly, and no additional storage space is reserved for a file whose size is not increased or increased negatively. For example, when the change rate of the storage space used by the file is a negative value or zero, no additional storage space is reserved for the file. When the change rate of the storage space used by the file is positive, the additional storage space reserved for the file is not less than storage space reserved for another file whose change rate is smaller than that of the storage space used by the file. For example, when the change rate of the storage space used by the file is positive, the larger the change rate of the storage space used by the file is, the larger the additional storage space reserved for the file is. In an implementation, a change rate may be divided into multiple sections. When the change rates of storage spaces used by different files belong to the same section, additional storage space with the same size may be assigned to the different files respectively. When the change rates of storage space used by different files belong to different sections, larger additional storage space is reserved for a file with a larger change rate.

If it is not needed to reserve additional storage space for an editable file, the same defragmentation method as that used for the non-editable file may be adopted. For example, the editable file may be arranged compactly to implement defragmentation.

In the embodiments of the present disclosure, a method for reserving the storage space for the file includes, through a programmable interface, configuring the size of the file as a sum of the actual size of the file and the size of the additional storage space to be reserved for the file, and storing the file according to the configured size of the file.

For example, if additional storage space of 1 K is to be reserved for a file of 1 K, the size of the file may be configured as 2 K through the programmable interface, and the file is stored according to the 2 K size. Though the additional storage space of 1K is reserved for the file, the storage space of 1 K is not used, but is reserved for contents that may be added in the future. Since the reserved storage space of 1 K has been set as storage space belonging to the file, a file system cannot assign the reserved storage space of 1 K to other files.

According to the storage location of the editable file, a method for preventing from assigning the reserved storage space to other files is provided.

A file system usually assigns storage space according to an order from the lowest LCN to the highest LCN. If a LCN corresponding to the storage location of the editable file is lower, and idle storage space reserved after the storage location of the editable file is not configured as storage space belonging to the editable file, that is, the editable file is not stored according to the sum of the actual size of the editable file and the size of the additional storage space to be reserved for the editable file, the idle storage space may be assigned to other files by the file system.

In order to prevent the idle storage space from being assigned to other files, a special storage region is marked off from disk space corresponding to a LCN higher than a predefined threshold, and is used for storing the editable file. When the editable file is stored continuously, the editable file is stored in the special storage region.

The predefined threshold may be a predefined fixed value, or a value that is determined according to a predefined rule and changes with different situations.

The file system usually assigns storage space according to an order from the lowest LCN to the highest LCN. When the editable file is stored in the special storage region, the file system does not assign the storage space of the special storage region to other files unless storage space corresponding to LCNs lower than the predefined threshold has been used up. When the file is stored in the storage region marked off from the disk space corresponding to the LCN higher than the predefined threshold, even if the additional storage space reserved at the tail of the file is not configured as the storage space belonging to the file, the additional storage space is not assigned to other files by the file system. The method for reserving the additional storage space for the file includes determining the initial storage location of the next editable file of the file as the sum of the terminal storage location of the file and the size of the additional storage space reserved for the file.

For example, suppose the terminal storage address of file 1 is A1 and the initial storage address of the next file recorded as file 2 is A2, additional storage space reserved for the file 1 is located between A1 and A2.

The method for configuring the size of the file as a sum of the actual size of the file and the size of the additional storage space to be reserved for the file and the method for storing the editable file in the disk space corresponding to the LCNs higher than the predefined threshold may be used at the same time.

Figure 6:
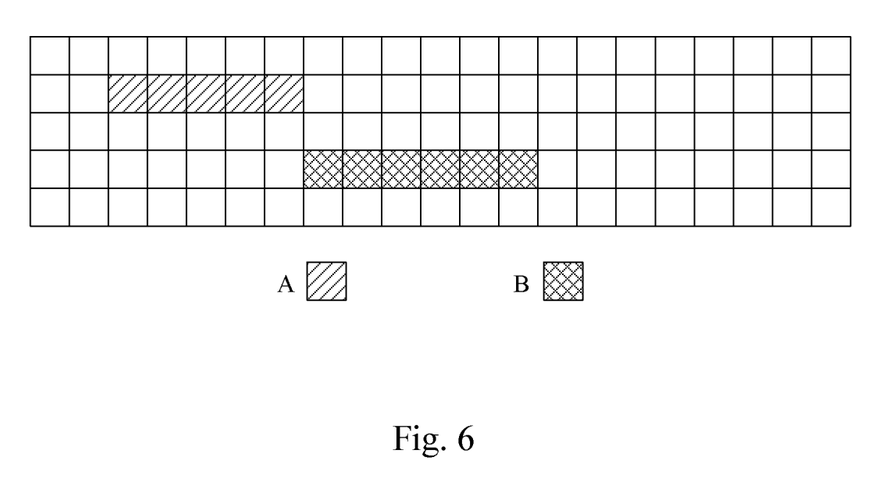
FIG. 6 is a diagram illustrating the original distribution of a file A and a file B.
Figure 7:
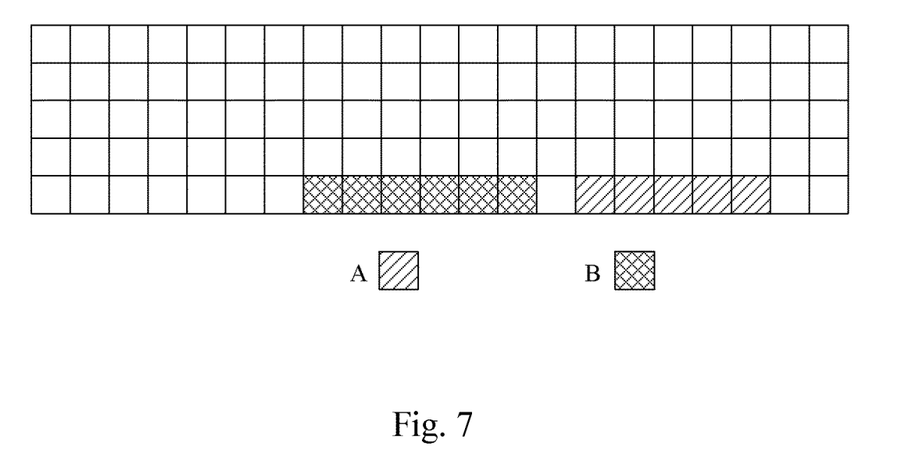
FIG. 7 is a diagram illustrating the distribution of the file A and the file B, where additional storage space is reserved for the file A and the file B respectively, and the file A and the file B are both stored in storage location corresponding to high LCNs.

Referring to FIGS. 6 and 7, the method for reserving the additional storage space for the editable file and the storage location of the editable file will be illustrated hereinafter.

FIG. 6 is a diagram illustrating the original distribution of a file A and a file B.

In FIG. 6, each cell represents storage space of 1 K, and the original storage location of the file A and the file B is shown in FIG. 6.

FIG. 7 is a diagram illustrating the distribution of the file A and the file B, where additional storage space is reserved for the file A and the file B respectively, and the file A and the file B are both stored in storage location corresponding to high LCNs.

In FIG. 7, the file B and the file A are both editable. Storage space of 1 K needs to be reserved for the file B, and storage space of 2 K needs to be reserved for the file A. As shown in FIG. 7, the file B and the file A are both moved to the storage location corresponding to high LCNs, and the storage space of 2 K is reserved for the file A, and the storage space of 1 K is reserved for the file B.

Figure 8:
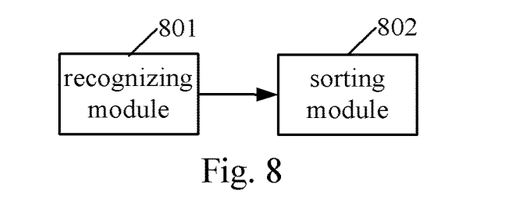
FIG. 8 is a diagram illustrating the structure of a file storage apparatus according to an embodiment of the present disclosure.

According to the above method, a file storage apparatus is provided according to an embodiment of the present disclosure, referring to FIG. 8.

FIG. 8 is a diagram illustrating the structure of a file storage apparatus according to an embodiment of the present disclosure.

As shown in FIG. 8, the apparatus includes a recognizing module 801 and a sorting module 802.

The recognizing module 801 may recognize an editable file.

The sorting module 802 may store the editable file continuously, and reserve storage additional space for the editable file.

In an implementation, the sorting module 802 may reserve the additional storage space at the tail of the editable file.

In an implementation, the sorting module 802 may configure the size of the editable file as a sum of the actual size of the editable file and the size of the additional storage space to be reserved for the editable file through a programmable interface, and store the editable file according to the configured size of the editable file.

In an implementation, the sorting module 802 may store the editable file a storage region marked off from disk space corresponding to LCNs higher than a predefined threshold.

In an implementation, the recognizing module 801 may determine whether a file is editable according to the suffix of the file. In another implementation, the recognizing module 801 may recognize an initial character string of the file, and determine whether the file is editable according to the initial character string of the file. In another implementation, the recognizing module 801 may recognize printable characters in the contents of the file, determine an occurring frequency of the printable characters in the contents of the file, and determine the file to be editable when the occurring frequency of the printable characters is higher than a predefined threshold. The recognizing module 801 may determine the file to be non-editable when the occurring frequency of the printable characters is not higher than the predefined threshold.

The file storage apparatus shown in FIG. 8 may be a computer device or another hardware device.

Figure 9:
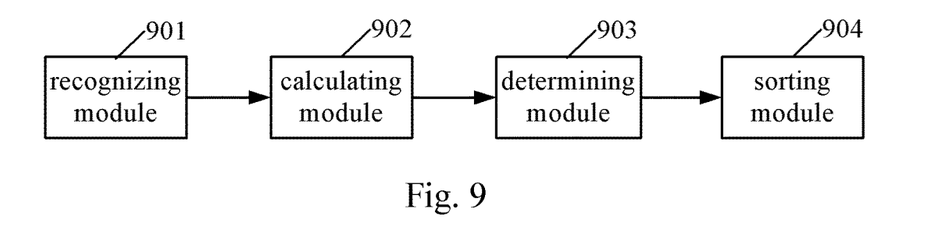
FIG. 9 is a diagram illustrating the structure of a file storage apparatus according to another embodiment of the present disclosure.

FIG. 9 is a diagram illustrating the structure of a file storage apparatus according to another embodiment of the present disclosure.

As shown in FIG. 9, the apparatus includes a recognizing module 901, a calculating module 902, a determining module 903 and a sorting module 904.

The functions of the recognizing module are similar to the functions of the recognizing module 801, and the functions of the sorting module 904 are similar to the functions of the sorting module 802.

The calculating module 902 may calculate the change rate of storage space used by the editable file.

The determining module 903 may determine the size of additional storage space to be reserved for the editable file according to the change rate.

The sorting module 904 may reserve the additional storage space at the tail of the editable file according to the size of the additional storage space.

When the change rate of the storage space used by the editable file is a negative value or zero, the determining module 903 does not reserve additional storage space for the editable file. When the change rate of the storage space used by the file is positive, the additional storage space reserved for the editable file by the determining module 903 is not less than additional storage space reserved for a file whose change rate is smaller than that of storage space used by the editable file.

The file storage apparatus shown in FIG. 9 may be a computer device or another hardware device.

The modules in the file storage apparatus shown in FIGS. 8 and 9 are divided by logical functions, and in an actual application, the function of one module may be implemented by multiple modules, or the functions of multiple modules may be implemented by one module. In another embodiment of the present disclosure, the file storage apparatus may further include a CPU and a storage. The modules in the file storage apparatus are connected to the CPU and the storage via an internal bus. Functions of the modules are mainly initiated or directed by the modules respectively. The functions may be implemented with the assistance of other modules, and may involve cooperation of multiple modules, e.g., may utilize processing functions of the CPU, may read information from the storage, may relay on the internal bus for data transmission, and etc.

The methods, modules and devices described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A file storage method, comprising:
    recognizing, by a computing device, an editable file;
    calculating, by the computing device, the change rate of storage space used by the editable file, and determining the size of additional storage space to be reserved for the editable file according to the change rate;
    storing, by the computing device, the editable file continuously, and reserving the additional storage space for the editable file, wherein the reserved additional storage space stores contents newly added into the editable file;
    wherein the reserving the additional storage space for the editable file comprises:
    reserving the additional storage space for the editable file according to the size of the additional storage space to be reserved for the editable file; and
    the determining the size of the additional storage space to be reserved for the editable file according to the change rate comprises:
    when the change rate of the storage space used by the editable file is a negative value or zero, reserving no storage space for the editable file; when the change rate of the storage space used by the file is positive, reserving the additional storage space for the editable file, wherein the reserved storage space is greater than or equal to storage space reserved for a file whose change rate is smaller than the change rate of the storage space used by the editable file.

2. The method of claim 1, wherein the reserving the additional storage space for the editable file comprises:
    reserving the additional storage space at the tail of the editable file.

3. The method of claim 1, wherein the reserving the additional storage space for the editable file comprises:
    configuring the size of the editable file as a sum of the actual size of the editable file and the size of the additional storage space to be reserved for the editable file through a programmable interface, and storing the file according to the configured size of the editable file.

4. The method of claim 1, wherein the storing the editable file continuously comprises:
    storing the editable file into a storage region marked off from disk space corresponding to a Logical Cluster Number (LCN) greater than a predefined threshold LCN.

5. The method of claim 1, wherein the recognizing the editable file comprises at least one of:
    determining whether a file is editable according to the suffix of the file;
    recognizing an initial character string of the file, and determining whether the file is editable according to the initial character string of the file;
    recognizing a printable character in the contents of the file, determining an occurring frequency of the printable character in the contents of the file, determining the file to be editable when the occurring frequency is greater than a predefined threshold frequency, and determining the file to be non-editable when the occurring frequency is less than or equal to the predefined threshold frequency.

6. A file storage apparatus, comprising a processor and a non-transitory storage, wherein the non-transitory storage stores one or more machine readable instructions, and the processor executes the machine readable instructions stored in the non-transitory storage to:
    recognize an editable file;
    calculate the change rate of storage space used by the editable file, and determine the size of additional storage space to be reserved for the editable file according to the change rate;
    store the editable file continuously, and reserve the additional storage space for the editable file, wherein the reserved additional storage space stores contents newly added into the editable file;
    wherein the processor executes the machine readable instructions stored in the non-transitory storage to
    reserve the additional storage space for the editable file according to the size of the additional storage space to be reserved for the editable file; and
    when the change rate of the storage space used by the editable file is a negative value or zero, reserve no storage space for the editable file; when the change rate of the storage space used by the file is positive, reserve the additional storage space for the editable file, wherein the reserved storage space is greater than or equal to storage space reserved for a file whose change rate is smaller than the change rate of the storage space used by the editable file.

7. The apparatus of claim 6, wherein the processor executes the machine readable instructions stored in the non-transitory storage to reserve the additional storage space at the tail of the editable file.

8. The apparatus of claim 6, wherein the processor executes the machine readable instructions stored in the non-transitory storage to configure the size of the editable file as a sum of the actual size of the editable file and the size of the additional storage space to be reserved for the editable file through a programmable interface, and store the file according to the configured size of the editable file.

9. The apparatus of claim 6, wherein the processor executes the machine readable instructions stored in the non-transitory storage to store the editable file into a storage region marked off from disk space corresponding to a Logical Cluster Number (LCN) greater than a predefined threshold LCN.

10. The apparatus of claim 6, wherein the processor executes the machine readable instructions stored in the non-transitory storage to determine whether a file is editable according to the suffix of the file; recognize an initial character string of the file, and determine whether the file is editable according to the initial character string of the file; recognize a printable character in the contents of the file, determine an occurring frequency of the printable character in the contents of the file, determine the file to be editable when the occurring frequency is greater than a predefined threshold frequency, and determine the file to be non-editable when the occurring frequency is less than or equal to the predefined threshold frequency.

11. A computer readable storage medium, comprising computer programs codes configured to, when executed by a processor, cause the processor to perform operations comprising:

recognizing an editable file;

calculating the change rate of storage space used by the editable file, and determining the size of additional storage space to be reserved for the editable file according to the change rate;

storing the editable file continuously, and reserving the additional storage space for the editable file, wherein the reserved additional storage space stores contents newly added into the editable file;

wherein the reserving the additional storage space for the editable file comprises:

reserving the additional storage space for the editable file according to the size of the additional storage space to be reserved for the editable file; and the determining the size of the additional storage space to be reserved for the editable file according to the change rate comprises:

when the change rate of the storage space used by the editable file is a negative value or zero, reserving no storage space for the editable file; when the change rate of the storage space used by the file is positive, reserving the additional storage space for the editable file, wherein the reserved storage space is greater than or equal to storage space reserved for a file whose change rate is smaller than the change rate of the storage space used by the editable file.

* * * * *